(12) United States Patent
Collette et al.

(10) Patent No.: US 12,015,704 B2
(45) Date of Patent: Jun. 18, 2024

(54) PARTICLE ACCELERATOR TO GENERATE RANDOM NUMBERS FOR CRYPTOGRAPHIC APPLICATIONS

(71) Applicant: BAE SYSTEMS Information and Electronic Systems Integration Inc., Nashua, NH (US)

(72) Inventors: Brian R. Collette, Merrimack, NH (US); Jonathan P Ingraham, Pelham, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 360 days.

(21) Appl. No.: 16/447,237

(22) Filed: Jun. 20, 2019

(65) Prior Publication Data

US 2020/0403790 A1    Dec. 24, 2020

(51) Int. Cl.
*H04L 9/08* (2006.01)
*G06F 7/58* (2006.01)

(52) U.S. Cl.
CPC ............ *H04L 9/0869* (2013.01); *G06F 7/588* (2013.01)

(58) Field of Classification Search
CPC ................................ H04L 9/0869; G06F 7/588
See application file for complete search history.

(56) References Cited

U.S. PATENT DOCUMENTS

| | | | | |
|---|---|---|---|---|
| 6,393,448 B1 * | 5/2002 | Dultz | ...................... | G06F 7/588 708/250 |
| 6,965,907 B2 * | 11/2005 | Klass | .................... | H04L 9/0852 708/3 |
| 7,519,641 B2 * | 4/2009 | Ribordy | ................ | H04L 9/0852 708/255 |
| 7,935,930 B1 * | 5/2011 | Gorrell | .................. | B82Y 20/00 250/341.1 |
| 8,575,867 B2 * | 11/2013 | Lal | .......................... | G21B 1/15 315/501 |
| 9,214,782 B2 | 12/2015 | Solgaard et al. | | |
| 10,523,433 B1 * | 12/2019 | Monahan | ................ | H04L 9/088 |
| 10,551,514 B1 * | 2/2020 | Newman | ............... | G01T 1/2002 |
| 10,978,303 B1 * | 4/2021 | Smayling | .............. | G06F 3/0623 |

(Continued)

OTHER PUBLICATIONS

Https://www.npr.org/sections/health-shots/2018/07/18/630101228/physicists-go-small-lets-put-a-particle-accelerator-on-a-chip.
Https://en.wikipedia.org/wiki/Moore's_law.
Https://csrc.nist.gov/Projects/Cryptographic-Module-Validation-Program/Standards.

*Primary Examiner* — Trang T Doan
(74) *Attorney, Agent, or Firm* — Maine Cernota & Curran; Gary McFaline

(57) ABSTRACT

A particle accelerator random number generator system comprises a particle accelerator, a particle event detector, and a processing application. Operation steps include initiating the particle accelerator; detecting a particle event by the particle event detector; recording a binary event from the detected particle event; determining if sufficient binary events have been recorded for the desired random number strength; if not, return to the step of detecting a particle event; if so, converting the random number binary string to a random number generated hexadecimal; applying the random number generated hexadecimal string for an encryption key; and using the random number hexadecimal key to encrypt an application.

19 Claims, 5 Drawing Sheets

RANDOM NUMBER GENERATOR ENVIRONMENT

(56) References Cited

U.S. PATENT DOCUMENTS

| | | | |
|---|---|---|---|
| 2007/0248212 A1* | 10/2007 | Might | G01N 23/22 |
| | | | 378/57 |
| 2007/0252089 A1* | 11/2007 | Gorrell | H01J 25/00 |
| | | | 250/399 |
| 2014/0287816 A1* | 9/2014 | Homer | G07F 17/326 |
| | | | 708/255 |
| 2019/0070438 A1* | 3/2019 | Tahar | H05H 13/085 |
| 2019/0243611 A1* | 8/2019 | Martin | G06F 7/588 |
| 2019/0378682 A1* | 12/2019 | Wang | G01T 1/247 |

* cited by examiner

RANDOM NUMBER GENERATOR ENVIRONMENT

PARTICLE ACCELERATOR CRYPTOGRAPHIC KEY GENERATOR (PACKG) DEVICE

DETECTOR ASSEMBLY

LINEAR DETECTION

METHOD STEPS

PARTICLE ACCELERATOR TO GENERATE RANDOM NUMBERS FOR CRYPTOGRAPHIC APPLICATIONS

FIELD

The disclosure relates to encryption. More specifically, to a device, method and system for generation of random numbers for use in cryptographic applications.

BACKGROUND

As computing technology improves (roughly in accordance with Moore's Law), especially with the advent of Quantum computing, the prerequisite time, skill, and power required to defeat modern cryptography becomes more and more reduced and thus significantly accessible. To counter this, better sources of random (numbers) and stronger encryption algorithms need to be developed to protect sensitive information (intellectual property, critical technology, and national security information) over the lifetime of that information. If these improvements are not made, information and technology which is considered sensitive will remain sensitive to compromise.

All cryptographic applications require random numbers. The "quality" of the randomness required for cryptographic applications varies. The guarantee of perfect secrecy only holds if the key source comes from a random source with high entropy, therefore many kinds of Pseudo-Random Number Generators (PRNGs) are insufficient.

Certainly, all random number generators are not the same, some are better than others; none currently on the market could be described as perfectly non-deterministic, i.e. perfectly random. In many cases, they have some underlying physical functions which generate pseudo-random values, and in some cases these can be predicted and thus defeated.

These PRNGs are embedded in various technologies for use in cryptographic applications. Mobile computers, smart phones, and servers all may contain PRNGs for various reasons from secure messaging to protection of data at rest. Current PRNGs are developed based on a variety of methods, including software or hardware centric methods which are used to generate the best random possible, which can be evaluated for effectiveness. Those which pass certain criteria will be certified under the FIPS-140 standard for PRNGs. However, as mentioned before, as technology improves these methods become more and more susceptible to attack, and although a device is deemed acceptable, it does not mean it is impervious to reverse engineering attacks.

Particle accelerators increase the energy of electrically-charged atomic particles. Charged particles include positive ions, negative ions, electrons, and protons. These high energy electrically-charged particles are accelerated to impact targets, and the resulting products are observed with a detector. Chip-scale linear beam particle accelerators are described, for example, in U.S. Pat. No. 9,214,782, and chip-scale curvilinear beam particle accelerators are described, for example, in U.S. Pat. No. 8,575,867, each of which is herein incorporated by reference for all purposes.

What is needed is a device, system, and method to generate truly random number sequences for cryptographic applications.

SUMMARY

An embodiment provides a particle accelerator random number generator comprising a particle accelerator, wherein the particle accelerator generates particles; and wherein the particle event detector detects events relating to the particles and outputs event output values corresponding to the detected events. In embodiments the particle event detector comprises a linear detector, wherein particle angles of arrival correspond to output values for the detected events. In other embodiments, the particle event detector comprises a cross-section detector wherein regions of the detector correspond to output values for the detected events. In subsequent embodiments the particle event detector comprises a return bounce angle detector. For additional embodiments the particle accelerator comprises a LINAC linear accelerator. In another embodiment, the particle accelerator comprises a synchrotron circular accelerator. For a following embodiment particle event detection comprises detecting charged particles. In subsequent embodiments particle event detection comprises detecting photons. In additional embodiments the particle event detector comprises a return bounce angle detector; wherein particles having a first return bounce angle correspond to a one, and particles having a second return bounce angle correspond to a zero. In ensuing embodiments the particle event detector comprises binary detector output. In included embodiments the particle event detector comprises a calorimetric detector for uncharged particles. In yet further embodiments the particle accelerator and the particle event detector dimensions are of nanometer-scale. In related embodiments the particle accelerator, the particle event detector, and the processing application comprise a unitary device. For further embodiments the particle accelerator, the particle event detector, and the processing application are unitary, and comprise a deployable computing device.

Another embodiment provides a particle accelerator random number generator method comprising determining a random number strength; initiating a particle accelerator; detecting a particle event; recording a binary event from the detected particle event; determining if sufficient binary events have been recorded for the determined random number strength; if not, return to the step of detecting a particle event; if yes, converting the random number binary string to a hexadecimal string; and passing a value back to an item that requested the random number strength. Yet further embodiments comprise applying the hexadecimal string for an encryption key. For more embodiments, values of consecutive particle event detections are used directly as a series of cryptographic values. Continued embodiments include recording a binary event from the detected particle event comprising discriminating a particle angle of arrival. For additional embodiments, detecting a particle event comprises fixed interval detection.

A yet further embodiment provides a particle accelerator random number generator system comprising a particle accelerator; a particle event detector; a processing application; determining a random number strength stored in the processing application; initiating the particle accelerator; detecting a particle event by the particle event detector; recording a binary event from the detected particle event; determining if sufficient binary events have been recorded for the determined random number strength; if not, return to the step of detecting a particle event; if yes, converting the random number binary string to a hexadecimal string; applying the hexadecimal string for an encryption key; and passing a value back to an item that requested the random number strength.

Figure 1:
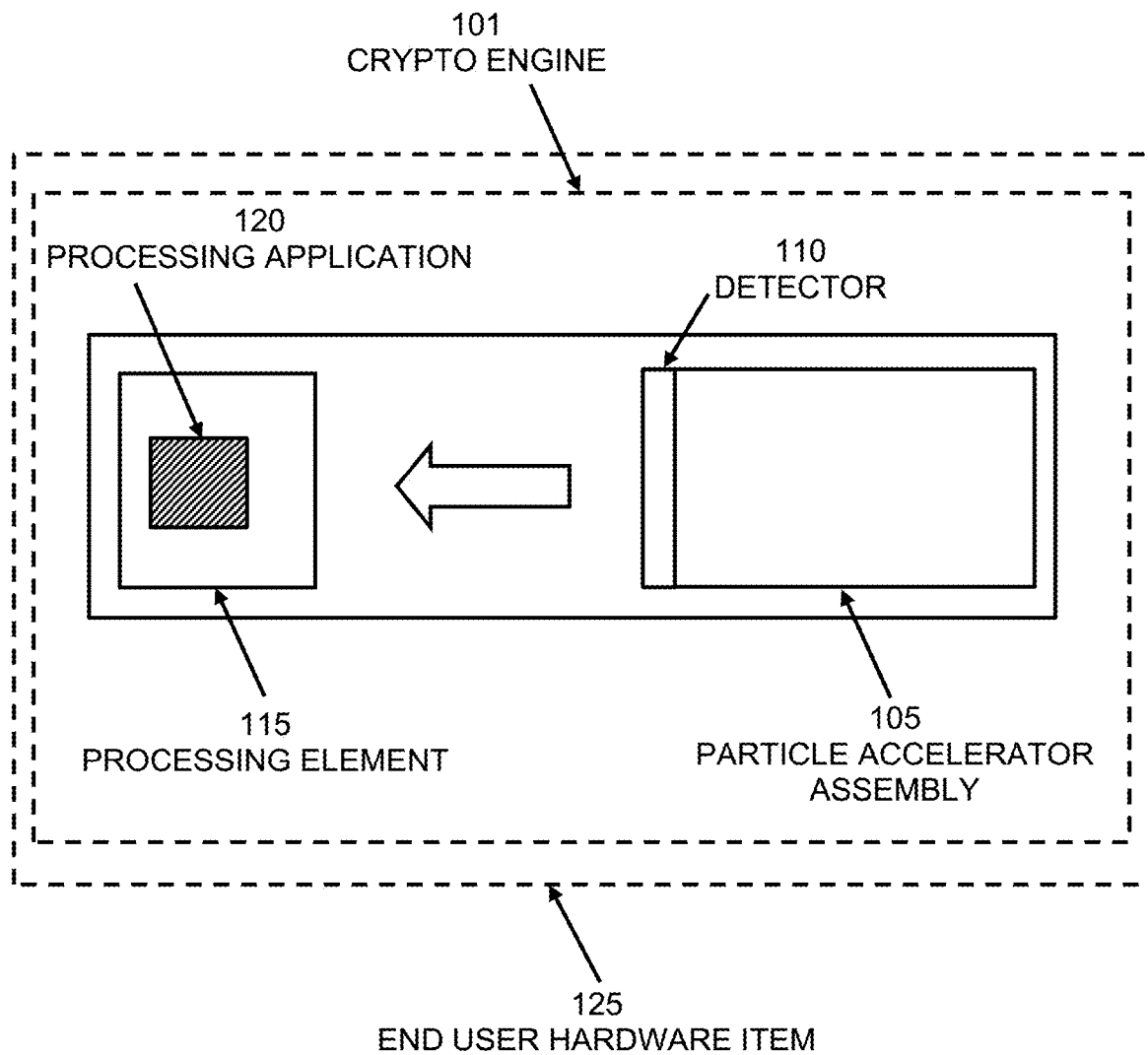
FIG. 1 illustrates a random number generator application environment configured in accordance with an embodiment.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

As stated, particle accelerators increase the energy of electrically-charged atomic particles, these high energy electrically-charged particles are accelerated to collide with targets, and the resulting products are observed with a detector. The entropy of the collision products is sufficient to provide true randomness.

Embodiments not only use the truly random nature of particle collision products to generate the strongest possible cryptographic values, but utilize a new particle accelerator hardware approach, enabling physical integration in small form factor (hand portable), deployable, hardware solutions. It is nearly impossible to predict the path of an energized particle. Therefore, the application of embodiments of this technology significantly improve encryption, and thus significantly improve device and information security.

Embodiments comprise the application of a small form factor particle accelerator as a source of random numbers to generate cryptographic values that are quintessentially random in nature (as opposed to traditionally pseudo-random numbers, or deterministic random numbers). They rely on no underlying physical architecture or concept other than the laws of physics which govern the physical universe. Cryptographic applications benefit from the most random values possible being used to generate keys, and this approach represents the perfect RNG for current and future encryption applications. Embodiments output random hexadecimal numbers. Applications of embodiments use the device to output random numbers of sufficient length such that another device can convert these numbers into keys. Other applications of embodiments use the device to generate random and then generate keys based on a request. In embodiments, processing application software converts the binary to a hexadecimal value of the appropriate length/algorithm. For example, a 3072 RSA key pair is different than an AES 512 key and requires differing amounts of random and processing to generate. In typical embodiments RNG generated hexadecimal values are passed to, for example, openSSL to generate an RSA key pair. AES keys would be generated from a random after executing a Secure Hash Algorithm (SHA) on it.

FIG. 1 depicts a random number generator application environment 100. Components of a particle accelerator cryptographic key engine 101 according to one example comprise a particle accelerator 105; particle event detector 110; crypto processing unit 115; and processing application 120. Embodiments for the particle accelerator cryptographic key engine 101 are deployed to an end user hardware item 125. Particle accelerator cryptographic key engine subsystem 101 is a subcomponent to user hardware end item 125 such as a circuit card, or USB dongle. In embodiments, the device is a Chip-Scale Device (CSD) included in smartphones, tablets, desktop computers, servers, self-encrypting USB thumb drives, self-encrypting hard drives, DoD circuit cards, automobile infotainment units, and automobile ECUs, providing RNG for foundational security. The electronics can comprise part of a circuit card assembly of any form factor. Some embodiments provide a small form factor, embedded circuit application, as part of a larger module form factor device. As mentioned, end user hardware item 125 can include mobile computers, desktop computers, smart phones, servers, automotive, USB devices, drones, and military applications where a high integrity random key is beneficial to assist in the implementation of security through cryptography. According to one embodiment, the particle accelerator cryptographic key engine components are embedded in the hardware item 125. In another embodiment the particle accelerator cryptographic key engine 101 components are coupled to the hardware item 125 by a dongle or card assembly via a cable such as USB. In yet a further embodiment, the particle accelerator cryptographic key engine 101 components include a transceiver element providing for wireless connectivity such that the particle accelerator cryptographic key engine 101 components provide information that is transmitted to the hardware item 125 by the transceiver element. In one example, the particle accelerator cryptographic key engine 101 components include memory and a processor for controlling the operation for generating the random numbers. In a further example the memory and processing technology of the end user hardware is shared with the particle accelerator cryptographic key engine 101 components allowing for processing and memory storage on the end user hardware 125.

Figure 2:
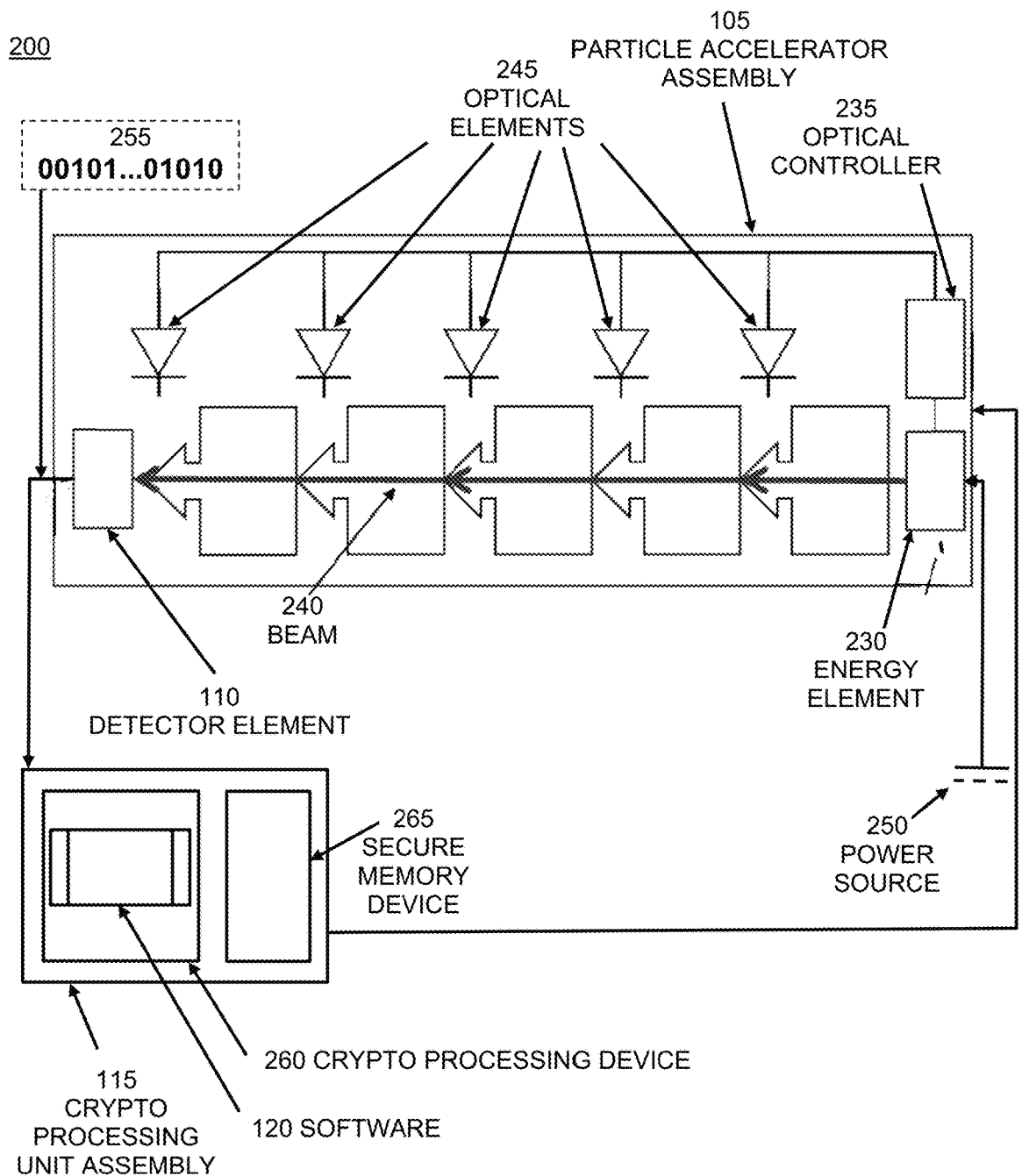
FIG. 2 depicts a Particle Accelerator Cryptographic Key Generator (PACKG) device configured in accordance with an embodiment.

FIG. 2 depicts an embodiment of the particle accelerator cryptographic key generator device 200. Components comprise particle accelerator assembly 105 and crypto processing unit assembly 115. Particle accelerator assembly 105 comprises particle event detector element 110, energy element 230, optical controller 235 used for controlling beam accelerator mechanisms such as a laser that generates beam 240 produced by energy element 230. Optical elements 245 can be used to focus the laser. Particle accelerator assembly 105 is linked to power source 250. In embodiments, a small form particle accelerator 105 only needs to accelerate the charged particles a short distance, therefore the required energy is not significant. Particle accelerator assembly 105 produces a unique pattern that is detected by detector element 110, and converted to truly random binary output 255. In embodiments, detector element 110 has an analog output that goes through an A/D converter. Crypto processing unit assembly element 115 comprises crypto processing device 260, secure memory device 265 and crypto key processing application software 120. In embodiments, crypto processing device 260 comprises an FPGA or other microprocessor. For embodiments, components 115, 120, and 260 are part of the same embedded package (in the form factor of roughly a system-on-a-chip). In additional embodiments, each of components 105, 110, 115, 120, 230, 235, 240, 245, and 265 is part of the same embedded package.

In embodiments, processing device 260 takes in the true random 255. Software/firmware (120) in crypto processing unit assembly 115 converts this true random binary into hexadecimal key values. These values either get stored in secure memory 265 or securely passed back to some other device/processes that requested the key value in the first place. Thus, software/firmware 120 also operates with a defined interface to communicate securely with other devices/processes.

In one example, particle accelerator 105 accelerates particles for detection at detector 110. The particle accelerator 105 uses electromagnetic fields to accelerate charged particles that travel at high speeds to detector 110. While particle accelerators have traditionally been viewed as large units, smaller portable units are now in use. As mentioned, since the charged particles are only traveling a short distance, these require low energy and are housed in a small form factor. In a further example, optics are used to focus the charged particles emitted from the particle accelerator. The unit may include shielding to prevent any potential harmful emissions from escaping the unit.

Figure 3:
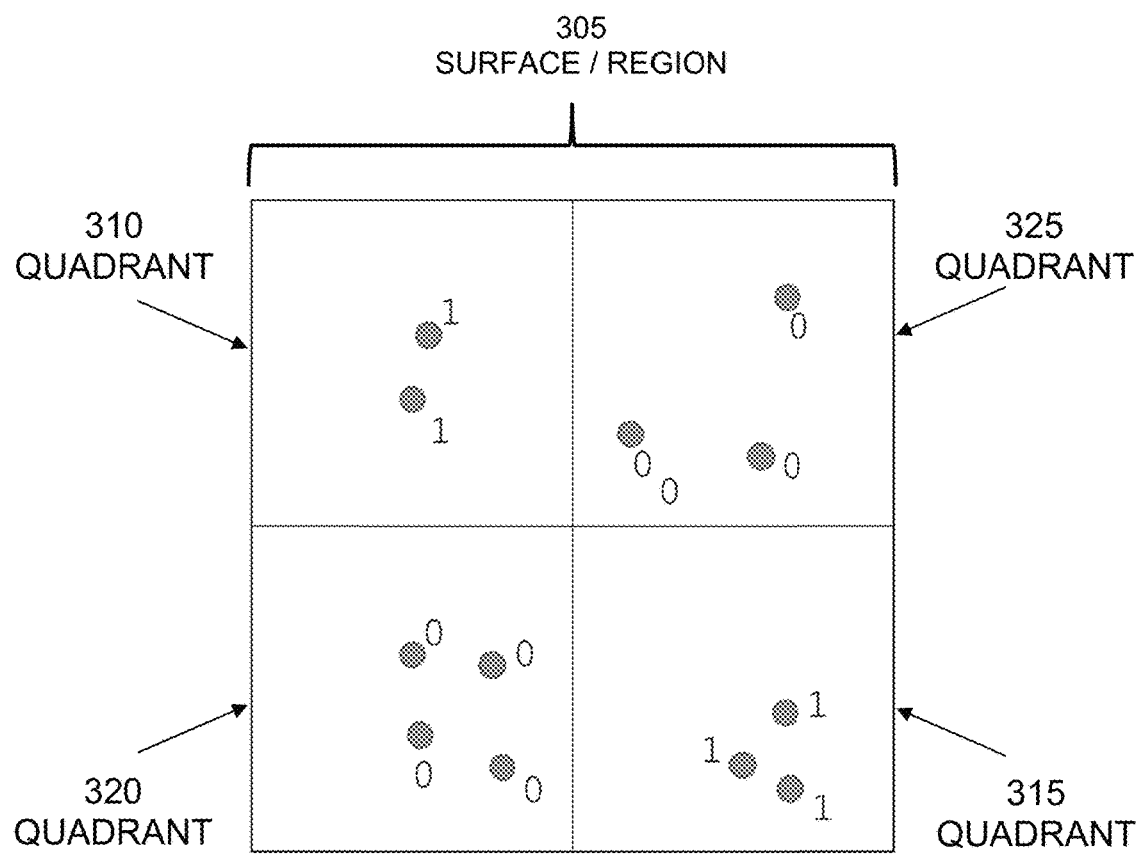
FIG. 3 depicts a detector assembly cross section in accordance with an embodiment.

Detector assembly 110, made up of quadrants (310, 315, 320, and 325 as shown in FIG. 3), detects the charged particles entering it and correlates their arrival time and position on a 2-dimensional access (using x and y coordinates to determine the resultant value of the particle being either a 0 or 1). The resultant values are passed via analog discrete passing either high (for 1) or low signals (for 0) to the processing element 115 for processing.

In this example, the detector 110 passes off the arrival position to the crypto key processing application software 120 on the crypto processing unit assembly element 115 which, in turn, generates binary strings for cryptographic keys. In embodiments, the output of the individual detector elements of the detector 110 is an analog value based on the received energy which can be converted to a digital format using an analog to digital converter. The results from the particle acceleration event result in detection binary results that are used to string together values of 1 s and 0s to form a random binary string which is converted to a hexadecimal for use as the value of a cryptographic key. Crypto processing unit assembly 115 provides an input to the particle accelerator assembly 105 for the optical controller 235/energy element 230 to tell how many random particle detection events to generate based on the required key size.

In embodiments, crypto processing assembly 115 contains control mechanisms, i.e. software, for both beam control and detection results processing. The crypto processing assembly takes input from an external source (such as a higher assembly command and control software embodiment which may be provided via analog discrete or digital means) which may or may not dictate the requirements for the keys to be generated. The crypto processing assembly then augments energy element 230, using software 120 and analog device controls, which cause it to produce a stream of particles which are accelerated towards detector 110. In embodiments, the crypto processing assembly also augments optical controller 235 to generate electromagnetic waves which pass through optical elements 245. The crypto processing assembly software activates the mechanisms monitoring the detector assembly, and processes the resulting detections (shown as 255) into binary values (either 0 or 1). The crypto processing assembly software processes these resulting detections into a key value for storage in 265, or immediate use in higher assembly command and control software.

In embodiments, processing is embedded at the circuit card assembly level of the hardware unit, the accelerator/detector component passes results (in the form of binary signals either high or low) to the crypto processing unit assembly 115 and thus to crypto processing device 260 where the key values are concatenated and validated in software.

FIG. 3 depicts a detector assembly embodiment 300. As particles impact a defined surface or region 305 (or cross a defined boundary), their position in space across that surface is recorded and used to determine an output value. For example, particles which arrive in certain quadrants 310/315 and 320/325 would receive a 1 or a 0 respectively. In embodiments, precise times of arrival are used to reduce the effect of particles hitting the region/boundary at the same time. In this simplified example, the output would start from one region and provide the output. In embodiments, the detector has a plurality of regions.

Figure 4:
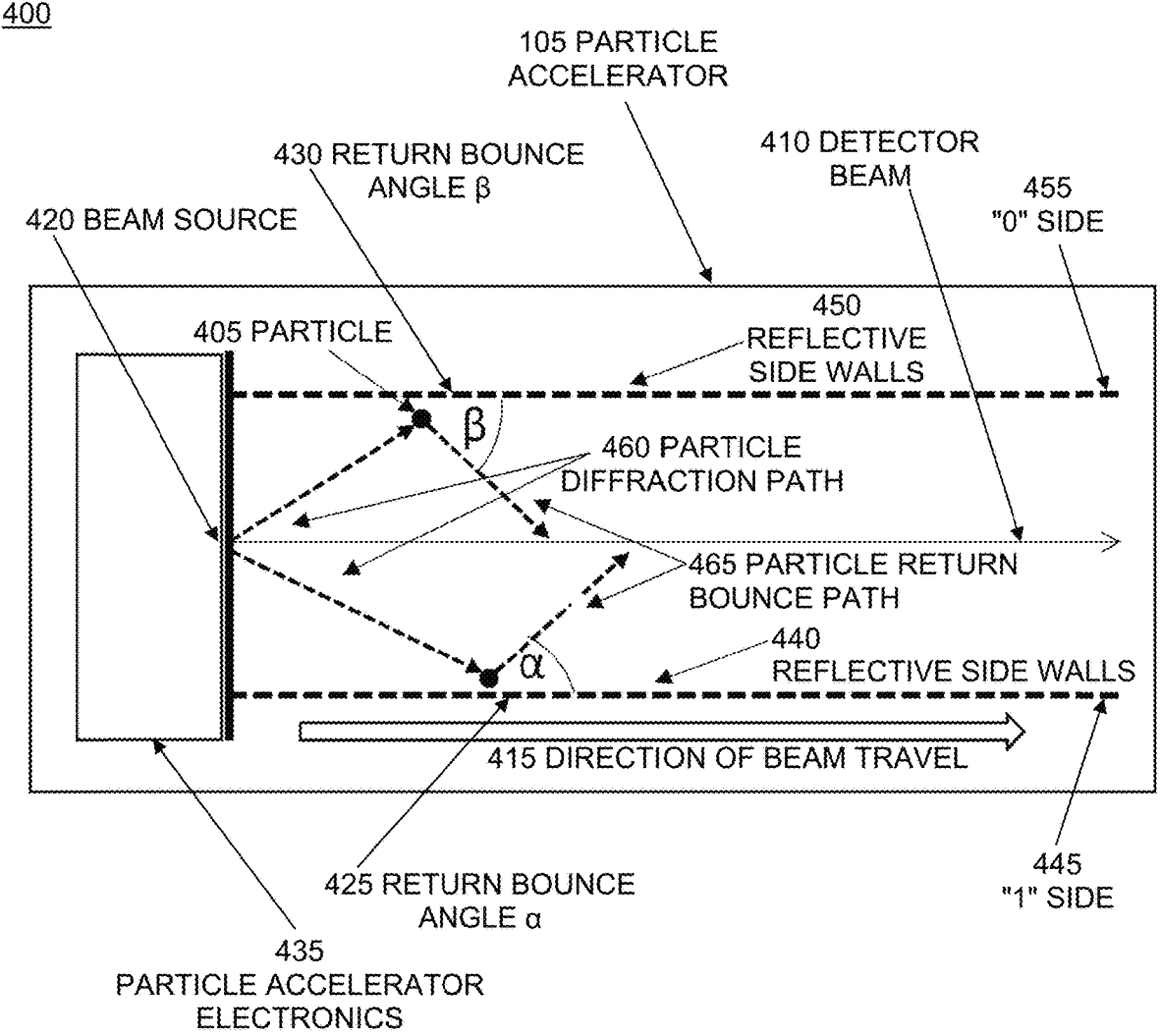
FIG. 4 depicts a linear event detection configuration in accordance with an embodiment.

FIG. 4 depicts a linear event detection system embodiment 400. For embodiments, as a particle 405 of detector beam 410 having a direction of beam travel 415 leaves beam source 420, its return bounce angle 425/430 is used to determine its output value. For example, a particle with a return bounce angle (or range of angles) a 425 results in a value of 1, whereas a particle arriving at angle (or range of angles) R 430 would receive a value of 0. Further defining particle accelerator 105, it comprises particle accelerator electronics 435, reflective side walls 440 corresponding to a "1" side 445, and reflective side walls 450 corresponding to a "0" side 455. Further particulars of particle 405 comprise particle diffraction path(s) 460 and particle return bounce path(s) 465, characterizing the particle beam. In embodiments detection is derived from angle of incidence (425 or 430) across detector beam 410. Event detection binary results are used to string together values of 1s and 0s to form a random binary string which is converted to a hexadecimal for use as the value of a cryptographic key.

Embodiments address event arrival time as a factor. A sufficiently small detection time window is measured to ensure that minimal collisions happen during the recording of event values. Rather than a quantum problem of velocity/position, this is an issue of ensuring that the detector does not overload. Given the volume of particles generated in embodiments, even if every other particle due to a collision were missed, a viable value is obtained as long as it produces a value in agreement with the initial key length request or specification.

Figure 5:
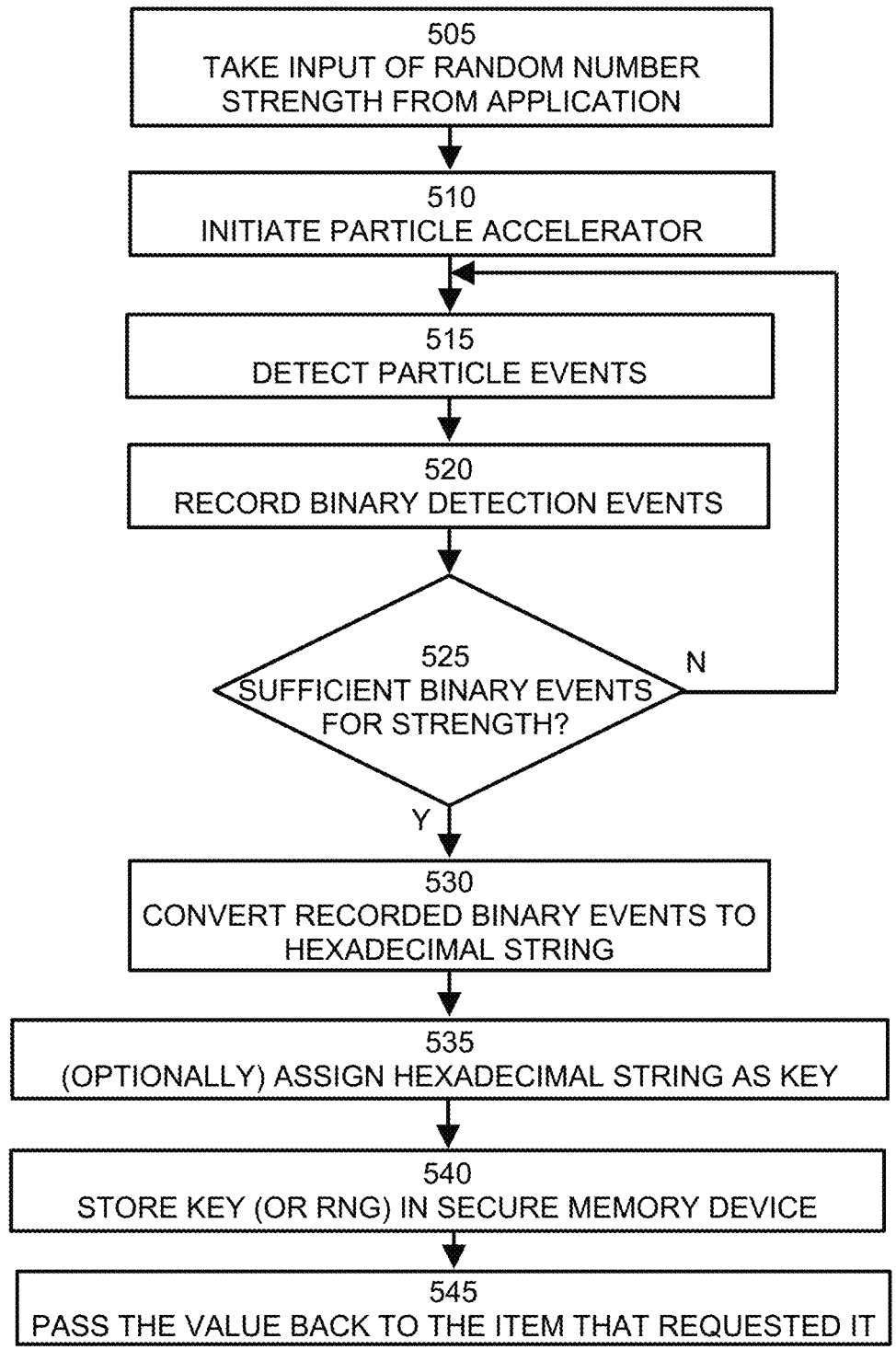
FIG. 5 is a flow chart for a method configured in accordance with an embodiment.

FIG. 5 is a flow chart 500 of a method for particle accelerator generation of random numbers for cryptographic applications according to one example. Steps comprise taking an input of random number strength from the application 505; initiating the particle accelerator 510; detecting particle events 515; recording binary detection events 520; determining if sufficient binary events have been recorded for the desired strength 525; if not, returning to the step of detecting particle events 515; if yes, converting the recorded binary events to a hexadecimal string 530; optionally assigning the hexadecimal string as a key 535; (for only RNG, just RNG is output) storing the key or RNG in a secure memory device 540; and pass the value back to the item that requested it 545.

Step 505 inputting random number strength comprises higher assembly command and control software either requesting a key with no specified value, in which case the crypto processing assembly software resorts to a default value as defined in software, otherwise the value provided by the higher assembly command and control software is used. Step 510 accelerator initiation details comprise the crypto processing assembly software 120 commanding the energy element to start producing particles for streaming in a beam 240 down the path of 105 in the direction of 415. Software 120 also commands the optical controller to begin emitting electromagnetic waves through optical elements 245 to accelerate 240 towards the detector assembly 110. Step 515 particle detection details comprise particles from 240 being detected in quadrants (310, 315, 320, 325) as shown in FIG. 3. Step 520 binary event recording details comprise the detector assembly 110 passing the results detected by the quadrants to the crypto processing assembly 115 where they are recorded as 1s and 0s accordingly, in order of arrival as provided by the detector. Step 525 determines if stored events are sufficient for predetermined key strength comprising crypto processing assembly software 120 calculating the resulting length value of the binary data stored and, if it is lower than desired, continuing to collect results from detector 110 until the desired amount is met. Step 530 converting the recorded binary events to a hexadecimal string comprises crypto processing assembly software 120 converting the stored binary to hexadecimal values and concatenating it into a single string. Step 535 (optionally) assigning the hexadecimal string as a key comprises crypto processing assembly software 120 assigning the key value to a slot in the secure memory device 265 and providing a reference number to any higher assembly command and control software or storing it in the local software 120 register, database, or conventional list mechanism.

The computing system used for the particle accelerator random number generator for performing (or controlling) the operations or functions described hereinabove with respect to the system and/or the method may include a processor, FPGA, I/O devices, a memory system, and a network adaptor. The computing system includes a program module (not shown) for performing (or controlling) the operations or functions described hereinabove with respect to the system and/or the method according to exemplary embodiments. For example, the program module may include routines, programs, objects, components, logic, data structures, or the like, for performing particular tasks or implement particular abstract data types. The processor may execute instructions written in the program module to perform (or control) the operations or functions described hereinabove with respect to the system and/or the method. The program module may be programmed into the integrated circuits of the processor. In an exemplary embodiment, the program module may be stored in the memory system or in a remote computer system storage media.

The computing system may include a variety of computing system readable media. Such media may be any available media that is accessible by the computer system, and it may include both volatile and non-volatile media, removable and non-removable media.

The memory system can include computer system readable media in the form of volatile memory, such as random access memory (RAM) and/or cache memory or others. The computer system may further include other removable/non-removable, volatile/non-volatile computer system storage media. The computer system can communicate with one or more devices using the network adapter. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to a flowchart illustration and/or block diagram of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A particle accelerator random number generator method comprising:
    determining a random number strength;
    initiating a particle accelerator;
    detecting a particle event;
    recording a binary event from said detected particle event;
    determining if sufficient binary events have been recorded for said determined random number strength;
    if not, return to said step of detecting a particle event; if yes, converting said random number binary string to a hexadecimal string; and
    passing a value indicative of the random number strength back to at least one of a device or process that requested said random number strength.

2. The particle accelerator random number generator method of claim 1, further comprising applying said hexadecimal string for an encryption key.

3. The particle accelerator random number generator method of claim 1, wherein values of consecutive particle event detections are used directly as a series of cryptographic values.

4. The particle accelerator random number generator method of claim 1, wherein recording a binary event from said detected particle event comprises discriminating a particle angle of arrival.

5. The particle accelerator random number generator method of claim 1, wherein detecting a particle event comprises fixed interval detection.

6. A particle accelerator random number generator system comprising:
    a particle accelerator;
    a particle event detector;
    a processing application which when executed performs the steps of:
        determining a random number strength stored in said processing application;
        initiating said particle accelerator;
        detecting a particle event by said particle event detector;
        recording a binary event from said detected particle event;

determining if sufficient binary events have been recorded for said determined random number strength;

if not, return to said step of detecting a particle event;

if yes, converting said random number binary string to a hexadecimal string;

applying said hexadecimal string for an encryption key; and passing, by the processing application, a value indicative of the random number strength back to at least one of a device or process that requested said random number strength.

7. The particle accelerator random number generator system of claim 6, wherein said particle event detector comprises a linear detector, wherein particle angles of arrival correspond to output values for said detected events.

8. The particle accelerator random number generator system of claim 6, wherein said particle event detector comprises a cross-section detector wherein regions of said detector correspond to output values for said detected events.

9. The particle accelerator random number generator system of claim 6, wherein said particle event detector comprises a return bounce angle detector.

10. The particle accelerator random number generator system of claim 6, wherein said particle accelerator comprises a LINAC linear accelerator.

11. The particle accelerator random number generator system of claim 6, wherein said particle accelerator comprises a synchrotron circular accelerator.

12. The particle accelerator random number generator system of claim 6, wherein particle event detection comprises detecting charged particles.

13. The particle accelerator random number generator system of claim 6, wherein particle event detection comprises detecting photons.

14. The particle accelerator random number generator system of claim 6, wherein said particle event detector comprises:

a return bounce angle detector;

wherein particles having a first return bounce angle correspond to a one, and particles having a second return bounce angle correspond to a zero.

15. The particle accelerator random number generator system of claim 6, wherein said particle event detector comprises binary detector output.

16. The particle accelerator random number generator system of claim 6, wherein said particle event detector comprises a calorimetric detector for uncharged particles.

17. The particle accelerator random number generator system of claim 6, wherein said particle accelerator and said particle event detector dimensions are of nanometer-scale.

18. The particle accelerator random number generator system of claim 6, wherein said particle accelerator, said particle event detector, and said processing application comprise a unitary device.

19. The particle accelerator random number generator system of claim 6, wherein said particle accelerator, said particle event detector, and said processing application are unitary, and comprise a deployable computing device.

\* \* \* \* \*